United States Patent
Ha et al.

(10) Patent No.: US 11,178,717 B2
(45) Date of Patent: *Nov. 16, 2021

(54) TRAFFIC DISTRIBUTION METHOD THROUGH MULTI-ACCESS NETWORK IN A NETWORK AND NETWORK ENTITY PERFORMING THE SAME

(71) Applicant: Electronics and Telecommunications Research Institute, Daejeon (KR)

(72) Inventors: Jeoung Lak Ha, Daejeon (KR); Yoo Hwa Kang, Daejeon (KR); Changki Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 14 days.

This patent is subject to a terminal disclaimer.

(21) Appl. No.: 16/418,631

(22) Filed: May 21, 2019

(65) Prior Publication Data

US 2019/0357294 A1 Nov. 21, 2019

(30) Foreign Application Priority Data

May 21, 2018 (KR) .................. 10-2018-0057841
May 17, 2019 (KR) .................. 10-2019-0058031

(51) Int. Cl.
*H04W 76/22* (2018.01)
*H04W 76/16* (2018.01)

(52) U.S. Cl.
CPC ............ *H04W 76/22* (2018.02); *H04W 76/16* (2018.02)

(58) Field of Classification Search
None
See application file for complete search history.

(56) References Cited

U.S. PATENT DOCUMENTS

| | | | |
|---|---|---|---|
| 10,264,413 B1* | 4/2019 | Bogineni | H04W 8/24 |
| 10,986,516 B2* | 4/2021 | Dao | H04W 24/08 |
| 2016/0007268 A1* | 1/2016 | Jung | H04W 48/18 370/338 |
| 2016/0139910 A1* | 5/2016 | Ramanathan | H04L 41/0893 717/170 |

(Continued)

FOREIGN PATENT DOCUMENTS

WO 2018008980 A1 1/2018

OTHER PUBLICATIONS

3GPP 23.793, SA2 #127 0.4.0, Apr. 30, 2018 (Year: 2018).*

(Continued)

*Primary Examiner* — Andrew C Oh
(74) *Attorney, Agent, or Firm* — Rabin & Berdo, P.C.

(57) ABSTRACT

A traffic distribution method through a multi-access network in a network and a network entity performing the same are disclosed. An access and mobility management function (AMF) may receive a PDU session modification request message including an ATSSS (access traffic steering, switching, and splitting) preference, which is a preference for an ATSSS rule, from an user equipment (UE) when a multi-access PDU session (MA PDU session) is established and the UE desires to change the ATSSS rule corresponding to the established MA PDU session. The AMF may transmit a first message including the ATSSS preference to a session management function (SMF).

11 Claims, 4 Drawing Sheets

(56) References Cited

U.S. PATENT DOCUMENTS

| | | | |
|---|---|---|---|
| 2016/0174123 A1* | 6/2016 | Hedberg | H04W 48/16 370/331 |
| 2016/0218979 A1 | 7/2016 | Roh | |
| 2017/0063699 A1 | 3/2017 | Kim | |
| 2017/0289898 A1* | 10/2017 | Youn | H04W 48/14 |
| 2018/0098251 A1 | 4/2018 | Li et al. | |
| 2018/0262924 A1* | 9/2018 | Dao | H04W 72/1257 |
| 2018/0331944 A1* | 11/2018 | Salkintzis | H04L 45/38 |
| 2018/0352449 A1* | 12/2018 | Park | H04W 76/10 |
| 2019/0158997 A1* | 5/2019 | Starsinic | H04W 4/70 |
| 2019/0230722 A1* | 7/2019 | Kawasaki | H04W 76/16 |
| 2019/0238425 A1* | 8/2019 | Mladin | H04L 41/5048 |
| 2019/0261260 A1* | 8/2019 | Dao | H04W 48/18 |
| 2019/0357129 A1* | 11/2019 | Park | H04W 48/18 |
| 2019/0357294 A1* | 11/2019 | Ha | H04W 76/15 |
| 2019/0373441 A1* | 12/2019 | Ryu | H04W 60/04 |
| 2019/0394711 A1* | 12/2019 | Kim | H04W 60/005 |
| 2020/0053802 A1* | 2/2020 | Li | H04L 41/5077 |
| 2020/0084691 A1* | 3/2020 | Wallentin | H04W 48/02 |
| 2020/0100101 A1* | 3/2020 | Torvinen | H04W 12/106 |
| 2020/0128471 A1* | 4/2020 | Liu | H04W 40/02 |
| 2020/0145953 A1* | 5/2020 | Youn | H04W 60/04 |
| 2020/0154320 A1* | 5/2020 | Xu | H04W 28/02 |
| 2020/0163145 A1* | 5/2020 | Park | H04W 76/18 |
| 2020/0170055 A1* | 5/2020 | Dou | H04W 76/11 |
| 2020/0213905 A1* | 7/2020 | Liu | H04W 28/10 |
| 2020/0229035 A1* | 7/2020 | Kim | H04L 47/2483 |
| 2020/0260325 A1* | 8/2020 | Futaki | H04W 76/22 |
| 2020/0367090 A1* | 11/2020 | Zhang | H04W 28/0247 |
| 2020/0382941 A1* | 12/2020 | Lee | H04W 36/32 |
| 2021/0029586 A1* | 1/2021 | Zhu | H04W 28/12 |
| 2021/0100047 A1* | 4/2021 | Chiba | H04W 28/0252 |
| 2021/0112478 A1* | 4/2021 | Dannebro | H04W 8/082 |

OTHER PUBLICATIONS

3GPP TS 23.502 V2.0.0 (Dec. 2017), 3rd Generation Partnership Project; Technical Specification Group Services and System Aspects; Procedures for the 5G System; Stage 2, (Release 15), pp. 1-259.

3GPP TS 23.793 V0.4.0 (Apr. 2018), 3rd Generation Partnership Project; Technical Specification Group Services and System Aspects; Study on Access Traffic Steering, Switching and Splitting support in the 5G system architecture, (Release 16), pp. 1-58.

Etri et al., "Updating 6.2 Solution 2 to add a procedure for Multi-Access PDU Session Modification", SA WG2 Meeting #128 S2-187108, Jul. 2-6, 2018, pp. 1-3.

Etri, "Updating 6.2 Solution 2 to add a procedure for Multi-Access PDU Session Modification", SA WG2 Meeting #128 S2-186794, Jul. 2-6, 2018, pp. 1-3.

* cited by examiner

TRAFFIC DISTRIBUTION METHOD THROUGH MULTI-ACCESS NETWORK IN A NETWORK AND NETWORK ENTITY PERFORMING THE SAME

CROSS-REFERENCE TO RELATED APPLICATION

This application claims priority to and the benefit of Korean Patent Application Nos. 10-2018-0057841 and 10-2019-0058031 filed in the Korean Intellectual Property Office on May 21, 2018 and May 17, 2019, respectively, the entire contents of which are incorporated herein by reference.

BACKGROUND OF THE INVENTION (a) Field of the Invention

The present invention relates to a traffic distribution method through a multi-access network in a network, and a network entity performing the same.

(b) Description of the Related Art

Recently, standardization of 5G network technology has been underway. In this 5G network, the standardization work is underway to support access traffic steering, switching, and splitting (ATSSS) between a 3GPP access network and a non-3GPP access network.

Traffic steering is a procedure that selects an access network for a new data flow and transfers the traffic of this data flow over the selected access network. Traffic switching is a procedure that moves all traffic of an ongoing data flow from one access network to another access network in a way that maintains continuity of the data flow. Traffic splitting is a procedure that splits the traffic of a data flow across multiple access networks. When traffic splitting is applied to a data flow, some traffic of the data flow is transferred via one access and some other traffic of the same data flow is transferred via another access.

In order to provide traffic (data, voice, etc.) to user equipment (UE) in a 5G network, packet data unit (PDU) session establishment is required between the UE and a data network. When the service is completed, the corresponding PDU session is released.

Existing PDU session establishment is performed only through the UE and one access network (3GPP access network or non-3GPP access network), thereby establishing a single access PDU (SA PDU) session. A plurality of SA PDU sessions may be established in one UE, and the plurality of SA PDU sessions may be distinguished through PDU session identifiers, respectively. If service provision to the UE is terminated or a user traffic session needs to be changed, the established PDU session may be modified or released by triggering of the UE or the network.

However, since an existing single access PDU (SA PDU) session is established for only one access network, user traffic belonging to the corresponding PDU session may not be transmitted/received through two or more access networks. Accordingly, it is difficult to provide a service supporting the ATSSS function. To support the ATSSS function, one PDU session with a unique identifier established over two or more accesses is required. This PDU session is called a multi-access PDU (MA PDU) session.

SUMMARY OF THE INVENTION

The present invention provides a method for distributing traffic to a multi-access network in an MA PDU session established for an ATSSS function, and a network entity performing the same.

According to an exemplary embodiment of the present invention, a method for modifying a packet data unit (PDU) session in a network is provided. The method may includes receiving, by an access and mobility management function (AMF), a PDU session modification request message including an ATSSS (access traffic steering, switching, and splitting) preference, which is a preference for an ATSSS rule, from an user equipment (UE) when a multi-access PDU session (MA PDU session) is established and the UE desires to change the ATSSS rule corresponding to the established MA PDU session and transmitting, by the AMF, a first message including the ATSSS preference to a session management function (SMF).

The method may further include receiving, by the AMF, a second message including a changed ATSSS rule corresponding to the ATSSS preference from the SMF.

The method may further include transmitting, by the AMF, a third message including the changed ATSSS rule to an access network, transmitting, by the access network, the changed ATSSS rule to the UE.

The method may further include performing, by the SMF, a session management policy modification with a policy control function (PCF) and receiving, by the SMF, the changed ATSSS rule from the PCF.

The method may further include generating, by the SMF, an N4 rule to be mapped to the changed ATSSS rule and transmitting, by the SMF, an N4 session modification request message including the N4 rule to an user plane function (UPF).

The changed ATSSS rule may include a rule identifier, a packet filter set indicating a set of service data flows, an ATSSS mode indicating an application mode for ATSSS operation between access networks, an access technology and sharing ratio indicating a traffic distribution ratio corresponding to a access type or a radio access technology, an ATSSS function indicating one of traffic distribution techniques, and a precedence indicating a priority between each ATSSS rule.

The first message may be an Nsmf_PDUSession_UpdateSMContext message, the Nsmf_PDUSession_UpdateSMContext message may include the PDU session modification request message, and the PDU session modification request message may include the ATSSS preference.

The second message may be an Nsmf_PDUSession_UpdateSMContext response message, the Nsmf_PDUSession_UpdateSMContext response message may include a PDU session modification command message, and the PDU session modification command message may include the changed ATSSS rule.

The third message may be an N2 session request message, the N2 session request message may include a PDU session modification command message, and the PDU session modification command message may include the changed ATSSS rule.

The transmitting to the UE may include performing, by the access network, resource modification with the UE, and transmitting, by the access network, a PDU session modification command message including the changed ATSSS rule to the UE.

The ATSSS preference may include information indicating a change to an ATSSS rule received from the network at the time of establishing the MA PDU session.

According to another exemplary embodiment of the present invention, a method for modifying a packet data unit (PDU) session in a network is provided. The method may include establishing a multi-access PDU session (MA PDU session) for an ATSSS (access traffic steering, switching, and splitting) function, transmitting, by an user equipment (UE), a PDU session modification request message including an ATSSS preference, which is a preference for an ATSSS rule, to an access and mobility management function (AMF) when the UE desires to change the ATSSS rule corresponding to the established MA PDU session, transmitting, by the AMF, a first message including the ATSSS preference to a session management function (SMF), and transmitting, by the SMF, a second message including a changed ATSSS rule corresponding to the ATSSS preference to AMF.

The changed ATSSS rule may include a rule identifier, a packet filter set indicating a set of service data flows, an ATSSS mode indicating an application mode for ATSSS operation between access networks, an access technology and sharing ratio indicating a traffic distribution ratio corresponding to an access type or a radio access technology, an ATSSS function indicating one of traffic distribution techniques, and a precedence indicating a priority between each ATSSS rule.

The first message may be an Nsmf_PDUSession_UpdateSMContext message, the Nsmf_PDUSession_UpdateSMContext message may include the PDU session modification request message, and the PDU session modification request message may include the ATSSS preference.

The second message may be an Nsmf_PDUSession_UpdateSMContext response message, the Nsmf_PDUSession_UpdateSMContext response message may include a PDU session modification command message, and the PDU session modification command message may include the changed ATSSS rule.

The method may further include transmitting, by the AMF, a third message including the changed ATSSS rule to an access network, and transmitting, by the access network, the changed ATSSS rule to the UE.

The third message may be an N2 session request message, the N2 session request message may include a PDU session modification command message, and the PDU session modification command message may include the changed ATSSS rule.

According to another exemplary embodiment of the present invention, a network entity that controls modification for a packet data unit (PDU) session in a network is provided. The network entity may include a processor controlling a change to an ATSSS (access traffic steering, switching, and splitting) rule corresponding to an established multi-access PDU session (MA PDU session) when the MA PDU session is established in user equipment (UE), and a network interface transmitting a PDU session modification request message including an ATSSS preference for the ATSSS rule to another network entity, wherein the ATSSS preference may be a preference derived by the UE for changing the ATSSS rule.

The network entity may be a session management function (SMF), the another network entity may be an access and mobility management function (AMF), and the SMF may perform a session management policy modification with a policy control function (PCF) and receives a changed ATSSS rule corresponding to the ATSSS preference form the PCF.

The changed ATSSS rule may include a rule identifier, a packet filter set indicating a set of service data flows, an ATSSS mode indicating an application mode for ATSSS operation between access networks, an access technology and sharing ratio indicating a traffic distribution ratio corresponding to an access type or a radio access technology, an ATSSS function indicating one of traffic distribution techniques, and a precedence indicating a priority between each ATSSS rule.

According to an exemplary embodiment of the present invention, it is possible to effectively provide traffic distribution through multi-access network in the MA PDU session by the modification procedure for the ATSSS rule.

DETAILED DESCRIPTION OF THE EMBODIMENTS

Figure 1:
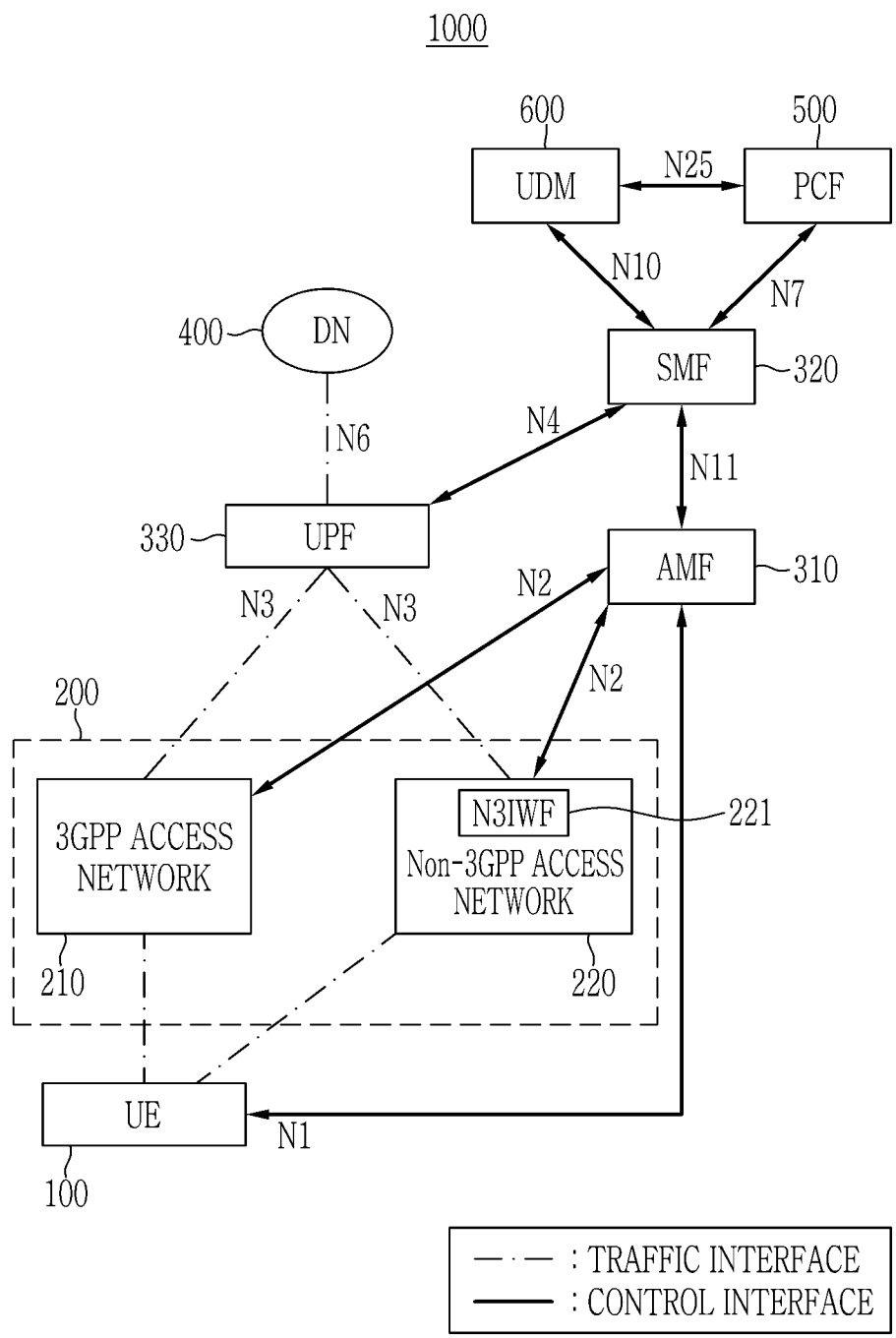
FIG. 1 is a diagram showing a 5G network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification, user equipment (UE) may indicate a terminal, a mobile terminal (MT), a mobile station (MS), an advanced mobile station (AMS), a high reliability mobile station (HR-MS), a subscriber station (SS), a portable subscriber station (PSS), an access terminal (AT), or the like, and may include all or some of the functions of the terminal, the MT, the AMS, the HR-MS, the SS, the PSS, the AT, or the like.

In addition, a base station (BS) may indicate an advanced base station (ABS), a high reliability base station (HR-BS), a nodeB, an evolved nodeB (eNodeB), a base transceiver station (BTS), a mobile multihop relay (MMR)-BS, a relay station (RS) serving as a base station, a high reliability relay station (HR-RS) serving as a base station, and the like, and may include all or some of the functions of the BS, the ABS, the nodeB, the eNodeB, the BTS, the MMR-BS, the RS, the HR-RS, and the like.

FIG. 1 is a diagram showing a 5G network according to an exemplary embodiment of the present invention.

As shown in FIG. 1, a 5G network 1000 according to an exemplary embodiment of the present invention includes user equipment (UE) 100, an access network (AN) 200, an access and mobility management function (AMF) 310, a session management function (SMF) 320, a user plane function (UPF) 330, a data network (DN) 400, a policy control function (PCF) 500, and a unified data management (UDM) 600.

The UE 100 may access a network through the AN 200. The AN 200 includes a 3GPP access network 210 and a non-3GPP access network 220. The UE 100 may access a mobile radio access network via the 3GPP access network 210. The UE 100 may access a wireless LAN access network via the non-3GPP access network 220. The non-3GPP access network 220 includes a non-3GPP interworking function (N3IWF) 221 for N3 and N2 interfaces with the UPF 330 and the AMF 310 by a 5G core network common interface principle.

The AMF 310 and the SMF 320 are network entities that process control signals. The AMF 310 and the SMF 320 have a non-access stratum (NAS) signal interface N1 in correspondence with the UE 100. The AMF 310 performs authentication, access, and mobility control functions through the N1 interface. The SMF 320 has a session control function (establishment/modification/release for a session) through the N1 interface with the UE 100 and an N4 interface with the UPF 330, and performs a signaling procedure for traffic path establishment and traffic mobility management.

The UPF 330 is a network entity of a data plane that accommodates the multiple access networks 210 and 220 via a common N3 interface. The UPF 330 connects a data plane between the multiple access networks 210 and 220 and the DN 400 so that traffic of the UE 100 (i.e., the user) can be transmitted and received.

The UPF 330 and the access network 200 receive control rules for traffic between the UE 100 and the UPF 330 via N4 and N2 interfaces from the SMF 320, respectively, and perform functions such as traffic detection, routing, and QoS control using the received control rules.

The PCF 500 is connected to the SMF 320 through an N7 signal interface, and controls policies related to session, mobility, and QoS. The PCF 500 may transmit policy and charging control rules (PCCs) required for the SMF 320 to map into (a) ATSSS rules to the SMF 320.

The UDM 600 is connected to the SMF 320 through an N10 signal interface, and manages user information management and policy for each UE such as subscription information of the UE 100. The UDM 600 may transmit information about the profile and subscription of the UE 100 for ATSSS function to the SMF 320.

As described above, the 5G network system according to an exemplary embodiment of the present invention is an integrated structure that simultaneously accommodates the 3GPP access network 210 and the non-3GPP access network 220. When an MA PDU session is established to provide the ATSSS function between the 3GPP access network 210 and the Non-3GPP access network 220 in such an integrated structure, it may be necessary to distribute the traffic to the multi-access network in the MA PDU session. Also, in case of distributed traffic through the MA PDU session, it may be necessary to modify the existing traffic distribution transmission method depending on the network situation. To this end, an efficient session modification method for the MA PDU session is required. Hereinafter, a method for modifying an MA PDU session will be described with reference to FIG. 2.

Figure 2:
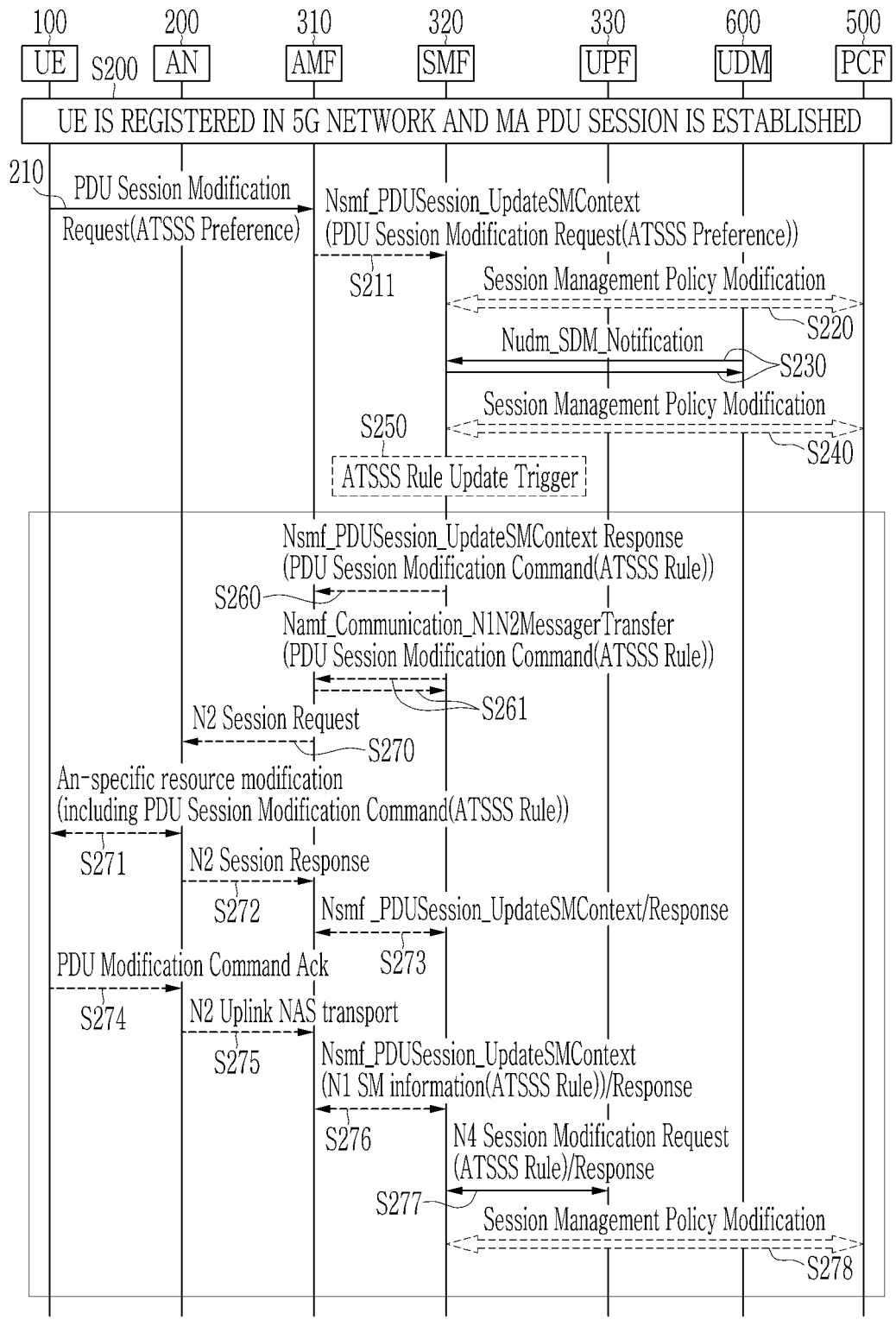
FIG. 2 is a flowchart showing a method for modifying an MA PDU session according to an exemplary embodiment of the present invention.

FIG. 2 is a flowchart showing a method for modifying an MA PDU session according to an exemplary embodiment of the present invention.

First, it is assumed in FIG. 2 that the UE 100 is already registered in the 5G network through the 3GPP access network 210 and the non-3GPP access network 220, and that an MA PDU session is created by MA PDU session establishment procedures (S200). The MA PDU session may have a unique (or the same) PDU session ID.

In the state in which the MA PDU session is established, the UE 100 triggers and requests a change of the ATSSS rule for a specific packet filter set to the core network. The core network may accept or accept by changing the ATSSS rule requested by the UE 100 in consideration of network conditions, and transmit the determined ATSSS rule (i.e. the accepted ATSSS rule or the changed ATSSS rule) to the UE 100. This procedure is S210, S211, S240, S260, and S270 to S278 described below.

Meanwhile, the ATSSS rule, which is triggered and changed by the core network instead of the UE 100, may be transmitted to the UE 100 and the UPF 330. This procedure is S220, S230, S261, and S270 to S278 described below. That is, steps S270 to S278 are performed in common both when triggered by the UE 100 and when triggered by the core network.

First, a procedure of triggering by the UE 100 will be described. The UE 100 transmits a PDU session modification request message to the AMF 310 via the access network 200 when the ATSSS rule needs to be changed (S210). The PDU session modification request message is an N1 NAS message, and includes an ATSSS preference and a PDU session ID. Here, the ATSSS preference is the same format as the ATSSS rule received from the network at the time of establishing the MA PDU session. The ATSSS preference indicates a changed ATSSS rule that the UE 100 requests to the network when the UE needs to change the existing ATSSS rule. For example, the ATSSS preference may be content requesting that a specific packet be transmitted simultaneously via the 3GPP access network 210 and the non-3GPP access network 200. Alternatively, the ATSSS preference may be a content requesting a change to the details of the existing ATSSS rule. Change to the ATSSS rule includes an addition of the ATSSS rule and a deletion of the ATSSS rule.

When receiving the PDU session modification request message in step S210, the AMF 310 transmits an Nsmf_PDUSession_UpdateSMContext message to the SMF 320 through the N11 interface (S211). The Nsmf_PDUSession_UpdateSMContext message includes the PDU session modification request message and the PDU session ID received in step S210.

When receiving the Nsmf_PDUSession_UpdateSMContext message in step S211, the SMF 320 performs a session management policy modification with the PCF 500 (S240). Here, the PCF 500 evaluates the ATSSS preference requested by the UE 100 based on a session management policy and performs the change of the ATSSS rule. The PCF 500 informs the SMF 320 of the changed ATSSS rule.

After step S240, the SMF 320 transmits an Nsmf_PDUSession_UpdateSMContext response message to the AMF 310 via the N11 interface (S260). Here, the Nsmf_PDUSession_UpdateSMContext response message includes a PDU session modification command, and the PDU session modification command includes the changed ATSSS rule. The PDU session modification command is a message to be transmitted from the SMF 320 to the UE 100, and is carried on an N1 SM container.

Next, a procedure for the core network to trigger and transmit the changed ATSSS rule to the UE 100 and the UPF 330 will be described. The change of the ATSSS rule by triggering the core network may be triggered by the UDM 600, the PCF 500, and the SMF 320.

The UDM 600 manages the MA PDU session information and the like of the subscriber, and the UDM 600 can trigger the change of the ATSSS rule when the subscriber profile related to the ATSSS is changed. When it is triggered by the UDM 600, the UDM transmits a Nudm_SDM_Notification (Network Interface UDM (Unified Data Management) SubscriberDataManagement_Notification) message to the SMF 320 (S230). That is, the UDM 600 triggers to update the ATSSS rule of the subscription data of the SMF 320 by transmitting a Nudm_SDM_Notification message to the SMF 320. The Nudm_SDM_Notification message includes session management subscription data. The SMF 320 updates the received session management subscription data and transmits an ACK (acknowledgment) message to the UDM 600 (S230).

The PCF 500 manages a Policy and Charging Control (PCC) rule necessary for generating an ATSSS rule, and the PCF 500 can trigger the change of the ATSSS rule. When triggered by the PCF 500, the PCF 500 performs a session management policy modification procedure with the SMF 320 (S220). That is, when the PCF 500 wants to change the ATSSS rule, the PCF 500 transmits a PCC rule necessary for changing the ATSSS rule to the SMF 320 using the session management policy modification procedure (S220).

Triggering by the SMF 320 occurs when the SMF 320 changes the ATSSS rule according to a local policy (S250).

When the triggering by the core network is performed as in the procedures of S220, S230, and S250, the SMF 320 transmits a Namf_Communication_N1N2MessageTransfer message to the AMF 310 via the N11 interface (S261). The Namf_Communication_N1N2MessageTransfer message includes a PDU Session Modification Command, and the PDU session modification command includes the changed ATSSS rule. The PDU session modification command is a message to be transmitted from the SMF 320 to the UE 100, and is carried on an N1 SM container.

Meanwhile, the change of the ATSSS rule by the triggering of the UE 100 and the change of the ATSSS rule by the triggering of the core network described above perform the following steps S270 to S278 in common. The following steps S272 to S276 may be omitted depending on the ATSSS rule to be changed. Hereinafter, this will be described in detail.

The AMF 310 transmits an N2 session request message to the access network 200 (S270). The N2 session request message includes the PDU session modification command message received in step S260 or S261, and the PDU session modification command message includes the changed ATSSS rule. The access network 200 receiving the N2 session request message in step S270 performs resource modification with the UE 100 (S271). In step S271, a PDU session modification command message, which is an N1 NAS message requesting modification of the PDU session, is transmitted to the UE 100. The PDU session modification command message includes the changed ATSSS rule. Meanwhile, the access network 200 transmits an N2 session response message, which is a response message to the N2 session request message received in step S270, to the AMF 310 (S272). The AMF 310 transmits the Nsmf_PDUSession_UpdateSMContext message to the SMF 320, and receives the Nsmf_PDUSession_UpdateSMContext response message from the SMF 320 (S273). Here, the Nsmf_PDUSession_UpdateSMContext message includes N2 SM information (for example, AN tunnel information) and location information of the UE.

The UE 100 receiving the PDU session modification command, which is the N1 SM (Session Management) NAS message, applies the received changed ATSSS rule in step S217. In response to the PDU session modification command, the UE 100 transmits a PDU session modification command ACK message, which is an N1 SM NAS message, to the access network 200 (S274).

The access network 200 transmits the N1 NAS message (the PDU session modification command ACK) received from the UE 100 in step S274 to the AMF 310 through an N2 uplink NAS transport message (S275).

The AMF 310 transmits an Nsmf_PDUSession_UpdateSMContext message to the SMF 320, and receives an Nsmf_PDUSession_UpdateSMContext response message from the SMF 320 (S276). Here, the Nsmf_PDUSession_UpdateSMContext message may include the N1 SM information (N1 SM Info). The N1 SM information indicates the changed ATSSS rule, the PDU session modification command ACK, and location information of the UE.

The PDU session modification command ACK message, which is the N1 SM NAS message, is transmitted to the SMF 320 through the access network 200 and the AMF 310 by steps S274 to S276. This N1 SM NAS message may contain the entirety of the changed ATSSS rule or an ATSSS rule ID.

The SMF 320 generates an N4 rule mapped to the changed ATSSS rule, transmits the generated N4 rule to the UPF 330 through an N4 session modification request message, and receives a response to the N4 session modification request (S277).

Meanwhile, when the ATSSS rule is changed by the triggering of the PCF 500, the SMF 320 notifies the completion of the ATSSS rule change to the PCF 500 through a session management policy modification procedure with the PCF 500 (S278).

If the distribution rate of traffic is spread over the multi-access network according to the changed ATSSS rule, steps S260 to S278 may be performed once again through another access network.

Figure 3:
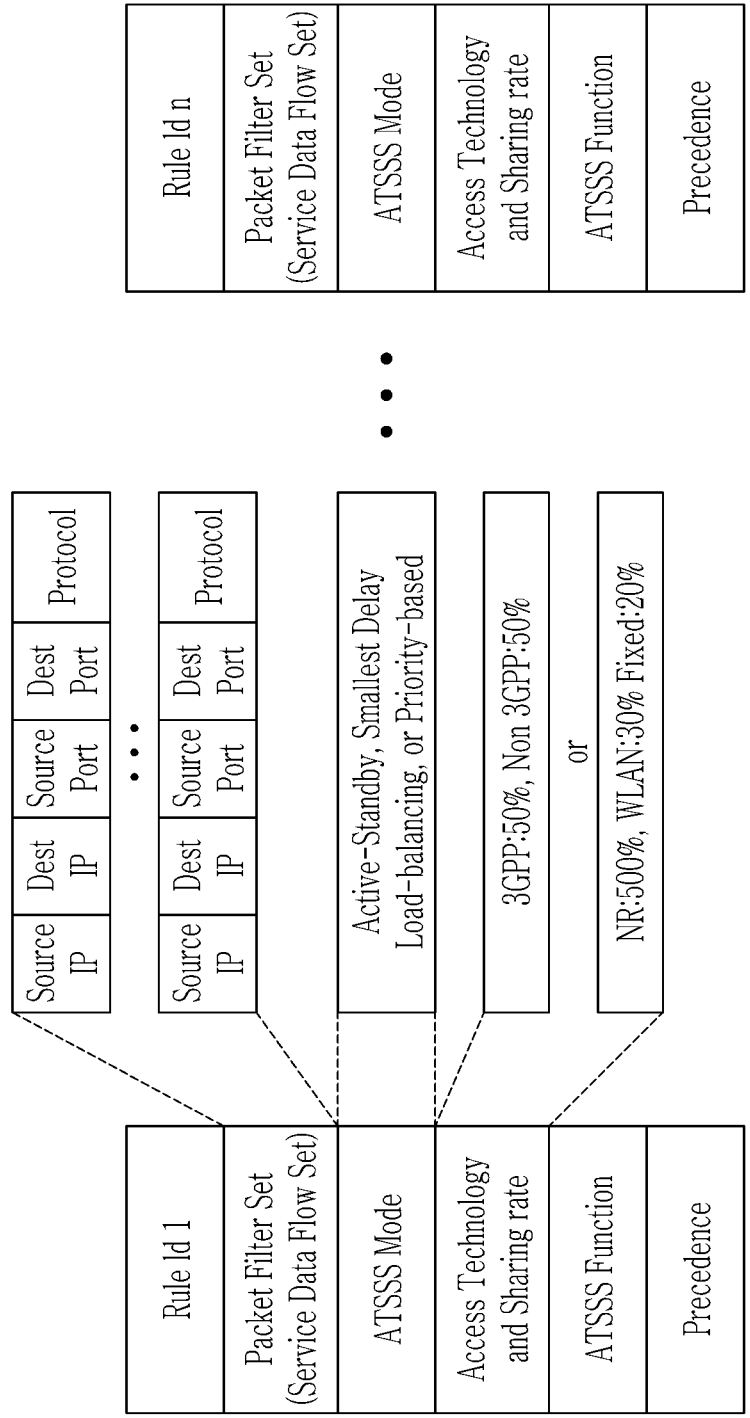
FIG. 3 is a diagram showing an ATSSS rule according to an exemplary embodiment of the present invention.

FIG. 3 is a diagram showing an ATSSS rule according to an exemplary embodiment of the present invention.

As shown in FIG. 3, the ATSSS rule includes a rule identifier (Rule Id), a packet filter set, an ATSSS mode, an access technology and sharing rate, an ATSSS function, and a precedence.

The rule identifier (ID) is an identifier that distinguishes the ATSSS rule.

The packet filter set indicates a set of service data flow (SDF) of a packet to which the ATSSS rule is applied, and the SDF may include an IP address, a port, a protocol, and the like.

The ATSSS mode indicates the mode of application for ATSSS operation between access networks. This ATSSS mode indicates one of an active-standby mode, a smallest delay mode, a load-balancing mode, and a priority-based mode. When one access is active and then unavailable, the active-standby mode is a mode in which other access that is in standby is operated. The smallest delay mode is a mode in which an access with a small delay is selected and operated based on the delay measured between the UE and the network. The load-balancing mode is a mode in which two accesses are used according to a divided ratio. The priority-based mode is a mode in which a predefined priority access is used in two accesses, and other access is used when congestion occurs in the priority access.

The access technology and sharing ratio indicates the traffic distribution ratio corresponding to the access type or the RAT (Radio Access Technology) type according to the ATSSS mode.

The ATSSS function indicates one of various traffic distribution techniques. For example, the ATSSS function indicates one of a number of steering functions (such as MPTCP or ATSSS-LL). Here, the MPTCP indicates that the multi-path TCP based on the existing IETF standard is used between the UE and the UPF, and the ATSSS-LL is the ATSSS-lower layer, which is newly implemented in the UE and the UPF.

Meanwhile, the precedence indicates the priority among the ATSSS rules.

Figure 4:
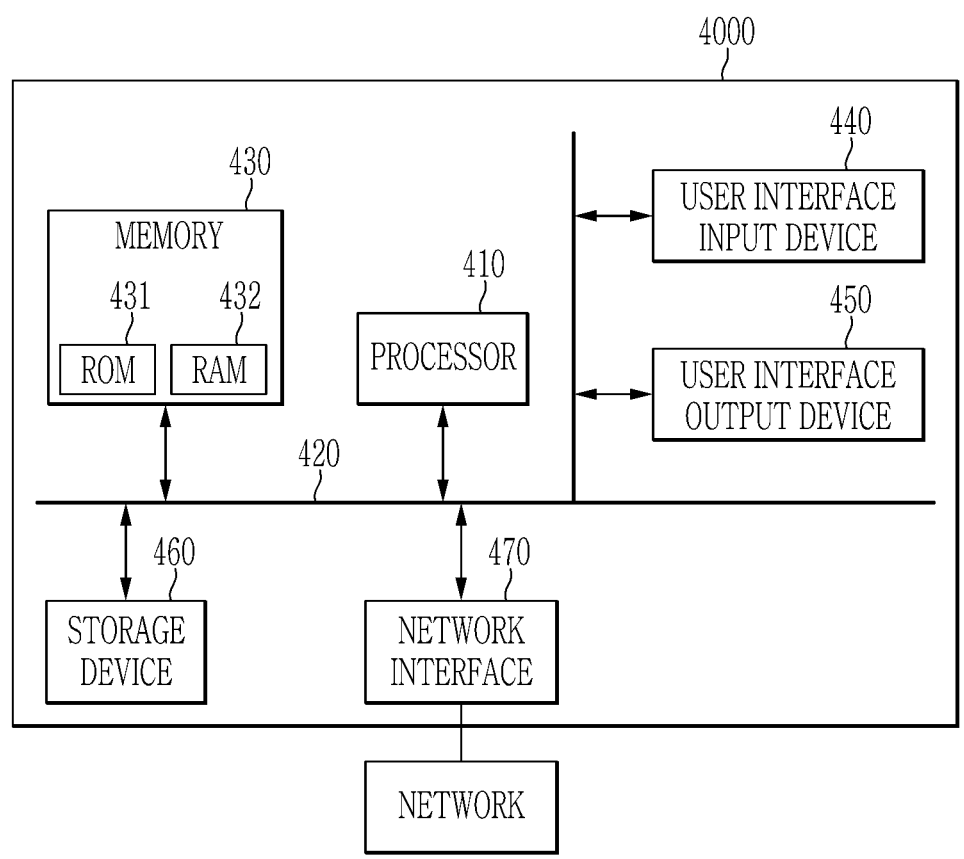
FIG. 4 is a diagram showing a computing system according to an exemplary embodiment of the present invention.

FIG. 4 is a diagram showing a computing system according to an exemplary embodiment of the present invention.

The computer system 4000 of FIG. 4 may be the AMF 310, the SMF 320, the UPF 330, the DN 400, the PCF 500, or the UDM 600 of FIG. 1. The UE 100, the access network 200, the AMF 310, the SMF 320, the UPF 330, the DN 400, the PCF 500, or the UDM 600 may be implemented as a computer system, for example, a computer readable medium.

The computer system 4000 includes at least one of a processor 410, a memory 430, a user interface input device 440, a user interface output device 450, and a storage device 460, that communicate via a bus 420. The computer system 4000 may also include a network interface 470 coupled to a network. The network interface 470 may transmit or receive signals with other entities over the network.

The processor 410 may be a central processing (CPU) or a semiconductor device that executes instructions stored in the memory 430 or the storage device 460. The processor 410 may be configured to implement the functions and methods described in FIG. 1 to FIG. 3.

The memory 430 and the storage device 460 may include various forms of volatile or non-volatile storage media. For example, the memory 430 may include a read only memory (ROM) 431 and a random access memory (RAM) 432. In an exemplary embodiment of the present invention, the memory 430 may be located inside or outside the processor 410, and the memory 430 may be coupled to the processor 410 through various already-known means.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of modifying a packet data unit (PDU) session by an access and mobility management function (AMF) in a network, the method comprising:
   receiving, by the AMF, a PDU session modification request message including an ATSSS (access traffic steering, switching, and splitting) preference from a user equipment (UE) when a multi-access PDU session (MA PDU session) is established, wherein the ATSSS preference indicates information on an ATSSS rule that the UE wants to change;
   transmitting, by the AMF, a first message including the ATSSS preference to a session management function (SMF); and
   receiving, by the AMF, a second message including a changed ATSSS rule corresponding to the ATSSS preference from the SMF,
   wherein the changed ATSSS rule includes an ATSSS function indicating traffic distribution technique of one of MPTCP (multipath transmission control protocol) and ATSSS-LL (ATSSS-lower layer).

2. The method of claim 1, further comprising:
   transmitting a third message including the changed ATSSS rule to an access network,
   wherein the changed ATSSS rule is transferred to the UE through the access network.

3. The method of claim 2, wherein
   the third message is an N2 session request message,
   the N2 session request message includes a PDU session modification command message, and
   the PDU session modification command message includes the changed ATSSS rule.

4. The method of claim 2, wherein
   the transferring to the UE includes performing, by the access network, resource modification with the UE, and transmitting, by the access network, a PDU session modification command message including the changed ATSSS rule to the UE.

5. The method of claim 1, further comprising
   performing, by the SMF, a session management policy modification with a policy control function (PCF) and receiving, by the SMF, the changed ATSSS rule from the PCF.

6. The method of claim 1, further comprising
   generating, by the SMF, an N4 rule to be mapped to the changed ATSSS rule and transmitting, by the SMF, an N4 session modification request message including the N4 rule to a user plane function (UPF).

7. The method of claim 1, wherein
   the changed ATSSS rule further includes a rule identifier, a packet filter set indicating a set of service data flows, an ATSSS mode indicating an application mode for ATSSS operation between access networks, an access technology and sharing ratio indicating a traffic distribution ratio corresponding to an access type or a radio access technology, and a precedence indicating a priority between each of ATSSS rules.

8. The method of claim 1, wherein
   the first message is an Nsmf_PDUSession_UpdateSMContext message,
   the Nsmf_PDUSession_UpdateSMContext message includes the PDU session modification request message, and
   the PDU session modification request message includes the ATSSS preference.

9. The method of claim 1, wherein
   the second message is an Nsmf_PDUSession_UpdateSMContext response message,
   the Nsmf_PDUSession_UpdateSMContext response message includes a PDU session modification command message, and
   the PDU session modification command message includes the changed ATSSS rule.

10. A session management function (SMF) that controls modification for a packet data unit (PDU) session in a network, the SMF comprising:
    a processor controlling a change to an ATSSS (access traffic steering, switching, and splitting) rule corresponding to an established multi-access PDU session (MA PDU session) when the MA PDU session is established in user equipment (UE); and
    a network interface receiving a PDU session modification request message including an ATSSS preference for the ATSSS rule from an access and mobility management function (AMF),
    wherein the ATSSS preference is a preference derived by the UE for changing the ATSSS rule, and
    the SMF transmits a changed ATSSS rule corresponding to the ATSSS preference to the AMF,
    wherein the changed ATSSS rule includes ATSSS function indicating traffic distribution technique of one of MPTCP (multipath transmission control protocol) and ATSSS-LL (ATSSS-lower layer).

11. The SMF of claim 10, wherein the changed ATSSS rule further includes a rule identifier, a packet filter set indicating a set of service data flows, an ATSSS mode indicating an application mode for ATSSS operation between access networks, an access technology and sharing ratio indicating a traffic distribution ratio corresponding to an access type or a radio access technology, and a precedence indicating a priority between each ATSSS rule.

* * * * *